United States Patent [19]

Kelly et al.

[11] 4,066,820

[45] Jan. 3, 1978

[54] PROCESSES FOR COATING FILMS

[75] Inventors: Roger Sidney Arthur Kelly, Stevenage; John Robert Wilson, Knebworth, both of England

[73] Assignee: Imperial Chemical Industries Limited, London, England

[21] Appl. No.: 561,663

[22] Filed: Mar. 24, 1975

[30] Foreign Application Priority Data

Mar. 29, 1974 United Kingdom ............... 13991/74
Mar. 29, 1974 United Kingdom ............... 13992/74
Mar. 29, 1974 United Kingdom ............... 13993/74

[51] Int. Cl.$^2$ .......................................... B32B 27/08
[52] U.S. Cl. .................................. 428/483; 428/515; 428/520; 427/407 G
[58] Field of Search ................ 428/483, 515, 520; 427/407 G, 171, 172, 131

[56] References Cited

U.S. PATENT DOCUMENTS

| 2,829,069 | 4/1958 | Michel | 428/483 |
| 3,276,899 | 10/1966 | Muhlberg et al. | 428/483 |
| 3,674,531 | 7/1972 | Shephard et al. | 427/407 X |
| 3,853,588 | 12/1974 | Haskell et al. | 427/407 X |

*Primary Examiner*—Ralph S. Kendall
*Attorney, Agent, or Firm*—Cushman, Darby & Cushman

[57] ABSTRACT

Substrate layers comprising an acrylic or methacrylic copolymer or a copolyester on a polyester film support are coated with an aqueous latex or solution comprising an acrylic or methacrylic copolymer, an unhydrolyzed or partially hydrolyzed polymer or copolymer of vinyl acetate or a copolymer of vinylidene chloride together with a crosslinking component. The coated films may be used in a variety of end uses, including drafting films.

10 Claims, No Drawings

PROCESSES FOR COATING FILMS

The present invention is concerned with processes for coating synthetic plastics films and to the resulting coated film products.

More particularly, the invention is concerned with the coating of film surfaces with aqueous latices and solutions of polymeric materials.

According to the present invention, a process for the production of a coated film comprises coating a substrate layer applied to a self-supporting synthetic linear polyester film with an aqueous polymeric latex or solution, wherein said substrate layer comprises a copolymer of acrylic acid or methacrylic acid or an ester of acrylic acid or methacrylic acid or a copolyester and the aqueous polymeric latex or solution applied thereto comprises:

i. one or more polymers or copolymers of one or more of acrylic acid, methacrylic acid, an ester of acrylic acid or methacrylic acid;
ii. an unhydrolysed or a partially hydrolysed polymer or copolymer of vinyl acetate; or
iii. one or more copolymers of vinylidene chloride; and one or more resinous components capable of intra-molecular cross-linking.

The invention also relates to a coated film which comprises a self-supporting synthetic linear polyester film having a substrate layer superimposed thereon, said substrate layer comprising a copolymer of acrylic acid or methacrylic acid or an ester of acrylic acid or methacrylic acid or a copolyester and a polymeric layer superimposed on the substrate layer comprising:

i. one or more polymers or copolymers of one or more of acrylic acid, methacrylic acid, an ester of acrylic acid or methacrylic acid;
ii. an unhydrolysed or a partially hydrolysed polymer or copolymer of vinyl acetate; or
iii. one or more copolymers of vinylidene chloride; and one or more resinous components capable of intra-molecular cross-linking.

In contrast to some known and proposed coating processes, it is not necessary to apply the aqueous polymeric latex or solution to the substrate layer during the process for film manufacture, such as during orientation or stretching, in order to achieve adequate coating adhesion. Thus, the latex or solution is applied after the film-forming process has been completed. For instance, in the case of oriented and heat-set films, the latex or solution is applied after orientation and heat setting.

The applied latex or solution may, if desired, include particulate or other additives selected for chosen end uses or may be applied as an anchor layer for other superimposed layers.

The process of the present invention may be applied to any suitable self-supporting synthetic linear polyester film, such as those films produced from polyesters which may be obtained by condensing one or more dicarboxylic acids or their lower alkyl diesters, e.g. terephthalic acid, isophthalic, phthalic, 2.5-, 2,6- and 2,7-napthalene dicarboxylic acid, succinic acid, sebacic acid, adipic acid, azelaic acid, pivalic acid, bibenzoic acid, and hexahydroterephthalic acid or bis-p-carboxyl phenoxy ethane, with one or more glycols, e.g. ethylene glycol, 1,3-propanediol, 1,4-butanediol, neopentyl glycol and 1,4-cyclohexanedimethanol. Biaxially oriented and heat-set films of polyethylene terephthalate are particularly useful for coating according to the invention.

When the substrate layer comprises a copolymer of acrylic acid or methacrylic acid or an ester of acrylic acid or methacrylic acid, it may for example comprise a copolymer formed from ethyl acrylate, methyl methacrylate and methacrylamide, particularly a copolymer having monomeric units in the proportion 45%, 50% and 5% by weight respectively which has been cross-linked with an alkoxylated melamine formaldehyde condensation product.

When the substrate layer comprises a copolyester, the copolyester may be derived from one or more of the aforementioned dicarboxylic acids or their lower alkyl diesters or bis-p-carboxyl phenoxy ethane with one or more of the aforementioned glycols, e.g. a copolyester of ethylene terephthalate, ethylene isophthalate and/or ethylene hexahydroterephthalate, especially a copolyester with 10 to 40 mole % of ethylene isophthalate.

The substrate layers applied to the self-supporting film may be applied to the film surface by known coating techniques, e.g. by coating from a liquid medium, melt coating or any other laminating methods known in the art. When the substrate layer comprises a copolyester, the composite film/substrate layer may be produced by coextrusion.

When the aqueous coating latex or solution comprises a polymer or copolymer of an acrylic or methacrylic acid ester, the ester may be methyl, ethyl, propyl, isopropyl, butyl, hexyl, heptyl, n-octyl, 2-ethylhexyl or glycidyl acrylate or methacrylate. Other comonomers such as styrene may be included to produce a copolymer. Preferably, the copolymer contains polymerised units which include functional groups, such as hydroxyl, amide, amine, nitrile, carboxyl, epoxy and trihydroxy silyl groups, thereby facilitating inter-molecular cross-linking with the resinous cross-linking component so as to improve the durability of the coating and its resistance to solvents.

Useful acrylic or methacrylic ester copolymers for use according to this invention in the coating latex or solution include copolymers of methyl methacrylate, ethyl acrylate and ureido complexes; a copolymer of 55 weight % methyl methacrylate and 45 weight % ethyl acrylate; a copolymer of 48 weight % methyl methacrylate, 40 weight % ethyl acrylate, 10 weight % glycidyl methacrylate and 2 weight % hydroxy ethyl methacrylate; and a copolymer of 50 weight % methyl methacrylate, 45 weight % ethyl acrylate and 5 weight % methacrylamide. When the substrate layer and the coating latex or solution both comprise an acrylic acid or methacrylic acid or an ester thereof, the copolymers may have the same or similar composition.

When the coating latex or solution comprises a vinyl acetate polymer, it is preferably a vinyl acetate copolymer, which may optionally be hydrolysed. Suitable comonomers include dialkyl, e.g. dioctyl, di-iso-octyl, and dibutyl, maleate, 2-ethylhexyl acrylate, ethylene, vinyl chloride, and vinyl esters of versatic acid. The vinyl acetate copolymer may also contain polymerised units which include functional groups, such as hydroxyl, amide, amine, nitrile, carboxyl, epoxy and trihydroxy silyl groups, thereby facilitating inter-molecular cross-linking with the resinous cross-linking component so as to improve the durability of the coating and its resistance to solvents.

Copolymers of at least 50 mole %, especially from 70 to 90 mole %, of vinyl acetate are preferred. It is preferred to use an unhydrolysed copolymer of vinyl acetate.

When the coating latex or solution comprises a vinylidene chloride copolymer, it may be formed with one or more comonomeric units which may be chosen from methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate; methyl isopropenyl ketone; acrylonitrile; methacrylonitrile; methyl vinyl ketone; vinyl chloride; vinyl acetate; vinyl propionate; vinyl chloroacetate; vinyl bromide; styrene; vinyl naphthalene; ethyl vinyl ether: N-vinyl phthalimide; N-vinyl succinimide; N-vinyl carbazole; isopropenyl acetate; acrylamide and methacrylamide or mono-alkyl substitution products thereof; phenyl vinyl ketone; diethyl fumarate; diethyl maleate; diethyl methylenemalonate; dichlorovinylidene fluoride; dimethyl itaconate; diethyl itaconate; dibutyl itaconate; vinyl pyridine; maleic anhydrode; allyl glycidyl ether and other unsaturated aliphatic ethers of the formula R—O—$R^1$ where R is vinyl, allyl, 2-methylallyl, 2-chloroallyl or allyloxymethyl and $R^1$ is R as aforesaid or lower alkyl, 2-chloroethyl, 2-hydroxyethyl or epoxypropenyl, e.g. compounds of the general formula:

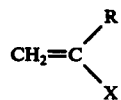

where R may be hydrogen, a halogen or a saturated aliphatic radical and X is selected from one of the following groups:

—Cl, —Br, —F, —CN, —$C_6H_5$, —COOH,

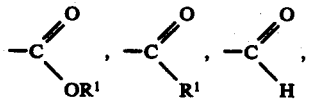

—$OC_6H_5$, —$CONH_2$, —CONH-$R^1$, and —$CONR_2^1$, in which $R^1$ is alkyl.

The vinylidene chloride copolymer may optionally, in addition to the aforementioned comonomeric units, contain comonomeric units of unsaturated aliphatic acids, e.g. itaconic acid, citraconic acid, acrylic acid or methacrylic acid.

The aqueous latex or solution also contains one or more intra-molecular cross-linking components which generally improve the adhesion of the coatings to the substrate and/or their durability and their resistance to solvents. Where appropriate, these components may also introduce inter-molecular cross-linking, as described previously, with any functional groups which may be present in the polymer or copolymer component of the coating latex or solution. The intra-molecular cross-linking components may comprise epoxy resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, e.g. formaldehyde. A useful condensation product is that of melamine with formaldehyde. The condensation product may optionally be alkoxylated.

A typical aqueous latex may include an ethyl acrylate/methyl methacrylate/methacrylamide copolymer, e.g. that of the monomer proportions specified above, and an alkoxylated amine/formaldehyde condensate.

The coating latex or solution may also contain viscosity modifying additives such as hydroxyethyl cellulose, and emulsifying agents.

A catalyst is also preferably employed to accelerate the intra-molecular cross-linking action of the resinous cross-linking component and also to accelerate its inter-molecular cross-linking action with cross-linkable functional groups, when present, in the copolymer component. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, and morpholinium para toluene sulphonate.

The polymeric or copolymeric component of the coating latex or solution employed according to this invention should preferably be film-forming at temperatures below about 50° C so that the final product after drying and curing is in the form of an integrated coating.

The aqueous latex or solution may be applied to the film surface by any suitable known film coating technique. The coated film should be dried, preferably by heating to a temperature exceeding 70° C and up to a maximum temperature determined by the plastics film employed. Heating serves to drive off the aqueous medium and also to facilitate the cross-linking reactions.

Depending on the end use of the coated film, the coatings may have thicknesses in the range 0.1 to 20 microns.

The coatings derived from the aqueous polymeric latices or solutions employed according to this invention adhere with remarkable tenacity to the substrate layers and exhibit improved durability and resistance to scratching than coatings applied directly to a film surface without an intermediate substrate. Thus, when the coatings contain particulate fillers for the production of drafting or drawing office films, they exhibit good resistance to damage and scratching by writing implements such as pens and pencils.

The coatings of this invention may contain any suitable additive such as particulate materials or fillers, dyes, pigments, and/or anti-static agents. For instance, particulate surface matting additives, e.g. silica particles, may be added to provide a matt surface on the finished coating. For example, in one embodiment of the invention, a drafting or drawing office film may be produced by including a particulate filler which in the finished coating provides a rough surface which is receptive to marking with writing implements such as pencils. Finely divided silica particles of average particle size in the range 0.5 to 25 microns may be employed in the production of such drafting or drawing office films. The coatings may also contain, if desired, additives for imparting ink receptivity. Coatings for drafting or drawing office materials may have a thickness of about 5 microns. The coatings may be sensitised with light-sensitive diazonium salts or coating compositions containing them. Matting additives may also be included, in other embodiments of the invention, for the production of matt stamping foils or for the provision of slip properties, e.g. as slip back coatings on magnetic recording materials, especially tapes.

Another embodiment of the invention relates to the magnetic coating of magnetic recording materials, such as magnetic recording tapes and discs, which may be produced by incorporating conventional magnetically susceptible materials such as ferromagnetic iron oxides, e.g. gamma ferric oxide, in the aqueous coating latex or solution.

In a further embodiment of the invention, the aqueous coating compositions may be used as printing compositions by the inclusion of suitable printing pigments or dyes.

Electrically conductive coatings may be produced in another embodiment of the invention by including electrically conducting additives, e.g. carbon black or metallic particles, in the coating composition. Such electrically conductive coatings may be applied as back coatings to magnetic recording tapes for antistatic purposes.

In other embodiments of the invention, the coatings may be applied as heat-sealable or barrier layers for packaging purposes. The coatings may also by employed as the carrier for the releasable layer in "carbon papers", and as the adhesive layer in adhesive tapes. They may also be rendered abrasive by the inclusion of abrasive fillers such as carborundum particles.

In other embodiments of the invention, the coating layer applied by the process of the invention may provide an anchor layer for subsequent coatings, e.g. further polymeric layers or light-sensitive photographic coatings.

The present invention also relates to the coated films produced by the process of coating with an aqueous composition and also to such products as matt surfaced films, e.g. drafting or drawing office films; stamping foils; slip coated films; magnetic recording tapes and discs; printed films; electrically conducting films; adhesive tapes; heat-sealable films; barrier coated films; "carbon papers"; abrasive films; and photographic films produced by the process of this invention.

The invention is further illustrated by the following examples.

EXAMPLES 1, 2 and 3

Coating latices were superimposed on a substrate underlying layer of a copolymer of 45% by weight ethyl acrylate, 50% by weight methyl methacrylate and 5% by weight methacrylamide cross-linked with a melamine formaldehyde condensate on the surface of a conventionally biaxially oriented and heat-set polyethylene terephthalate film. The general latex composition is given below and Table 1 indicates the specific copolymer component, the condensation product (intramolecular cross-linking component) and the catalyst ingredient used in each example and the properties of the finished coating.

The coating latices had the following general composition, percentages being quoted by weight:

| | |
|---|---|
| Copolymer of acrylic acid, methacrylic acid or an ester thereof | 14.0% based on weight of solids |
| Condensation product | 4.6% |
| Catalyst | 0.14% |
| Particulate silica, commercially available as "Celite" | 8.0% |
| Hydroxy ethyl cellulose | 0.5% |
| Water | to make 100% |

The acrylic and methacrylic copolymers employed were proprietary aqueous latices and in these instances the 14% quantity mentioned above represents the copolymer "solids" content of the latex.

The coating was applied by conventional means and was dried and cured by heating for one minute at 150° C.

The finished coating, which was approximately 5 microns thick, was tested for adhesion to the film, scratch resistance, rub resistance and solvent resistance.

Adhesion was evaluated by applying a pressure sensitive adhesive tape to the coating and evaluating the area of coating removed from the film surface when the tape was separated sharply from the coated film. The adhesion results in Table 1 are quoted in terms of the area of coating remaining after the removal of the adhesive tape.

Scratch resistance was evaluated by applying a cross-hatch pattern to the coating with a glassware marker under standard pressure and observing if the scratching penetrated to the underlying film. The results in Table 1 are given on a scale of 0 to 4, in which 1 represents a fair resistance to scratching and 4 indicates an excellent resistance to scratching as exhibited by a resistance to penetration of the marker through the coating to the film.

Rub resistance was evaluated by soaking a cloth in acetone and repeatedly rubbing over the same area of coating. Table 1 indicates the number of rubs required to completely remove the coating.

Solvent resistance was assessed by allowing a pool of acetone to soak into the coating and then to evaporate. The coating was considered to be solvent resistant if the treated area was free from deformation and wrinkling.

TABLE 1

| Example | Polymer | Condensation Product | Catalyst | Adhesion Test | Scratch Test | Rub Test |
|---|---|---|---|---|---|---|
| 1 | "Primal" P376 (analysis styrene/ butyl acrylate/a carboxylic acid copolymer) | "BE336" melamine formaldehyde | ammonium chloride | 100 | 3 | 24 |
| 2 | "Glascol" HA2 | " | None | 100 | 3 | 35 |
| 3 | " | " | maleic acid/ base | 100 | 4 | 20 |

The products of Examples 1, 2 and 3 were solvent resistant and suitable for use as drafting or drawing office films.

EXAMPLES 4 TO 13

Coated films were prepared by the procedure and using the general latex composition described in relation to Examples 1, 2 and 3 and were tested by the same procedure. In these Examples 4 to 13, however, the latex coating was superimposed on the copolyester substrate layer of a biaxially oriented and heat-set copolyester/polyethylene terephthalate laminate film. The copolyester layer was formed from 20 mole % ethylene isophthalate and 80 mole % ethylene terephthalate units. The latex ingredients and the properties of the coated film are shown in Table 2. The coating thickness was about 5 microns. Comparative examples, designated in Table 2 as "control," are provided to demonstrate the effect of omitting the condensation product.

ventionally biaxially oriented and heat-set polyethylene terephthalate film. The general coating composition is given below and Table 3 indicates the specific copolymer component, the condensation product (intramolecular cross-linking component) and the catalyst ingredient used in each example and the properties of the finished coating.

The coating compositions had the following general

TABLE 2

| Example | Polymer | Condensation Product | Catalyst | Adhesion Test | Scratch Test | Rub Test |
|---|---|---|---|---|---|---|
| 4 | "Primal" P376 (analysis styrene/ butyl acrylate/a carboxylic acid copolymer) | "BE336" melamine formaldehyde | None | 100 | 3 | >80 |
| 5 | " | "BE670" melamine formaldehyde | " | 100 | 4 | >80 |
| 6 | " | "BT309" melamine formaldehyde | " | 100 | 4 | 65 |
| 7 | " | "BT333" urea formaldehyde | " | 100 | 4 | >80 |
| 8 | " | "W1772" alkyd | " | 100 | 4 | >80 |
| 9 | " | "W1760" alkyd | " | 100 | 4 | >80 |
| 10 | "Primal" P376 (analysis styrene/ butyl acrylate/a carboxylic acid copolymer) | "Epikote" 812 epoxy resin | None | 100 | 4 | >80 |
| Control | " | None | None | 10 | 3 | 6 |
| 11 | Copolymer of 50% by weight methyl methacrylate/45% by weight ethyl acrylate/5% by weight methacrylamide | "BE336" melamine formaldehyde | None | 100 | 1 | >80 |
| 12 | "Glascol" HA2 | " | None | 100 | 4 | 80 |
| Control | " | None | None | 100 | 0 | 4 |
| 13 | "Primal" AC73 | " | None | 100 | 4 | >80 |
| Control | " | None | None | 100 | 4 | 4 |

The films prepared in Examples 4 to 13 were all solvent resistant and were suitable for use as drafting or drawing office materials.

EXAMPLES 14 TO 22

Coated films were prepared by the procedure described in relation to Examples 1, 2 and 3 and were tested by the same procedure. In these Examples 14 to 22, the coating was superimposed on an underlying substrate layer of a copolymer of 45% by weight ethyl acrylate, 50% by weight methyl methacrylate and 5% by weight methacrylamide cross-linked with a melamine formaldehyde condensate on the surface of a concomposition, percentages being quoted by weight:

| | |
|---|---|
| Vinyl acetate polymer | 14.0% |
| Condensation product | 4.6% |
| Catalyst | 0.14% |
| Particulate silica, commercially available as "Celite" | 8.0% |
| Hydroxy ethyl cellulose | 0.5% |
| Water | to make 100% |

A comparative example, designated "control" in Table 3, is provided to demonstrate the effect of omitting the condensation product.

TABLE 3

| Example | Polymer | Condensation Product | Catalyst | Adhesion Test | Scratch Test | Rub Test |
|---|---|---|---|---|---|---|
| Control | "Elvacet" 81-900 vinyl acetate polymer | None | None | 10 | 1 | 3 |
| 14 | " | "BE336" melamine formaldehyde | ammonium chloride | 100 | 3 | 8 |
| 15 | 85 mole % vinyl acetate/15 mole % ethyl hexyl acrylate copolymer | " | None | 100 | 4 | 2 |
| 16 | " | " | maleic acid/ base | 100 | 0 | 2 |
| 17 | 80 mole % vinyl acetate/20 mole % ethyl hexyl acrylate copolymer | " | None | 100 | 4 | 2 |
| 18 | " | " | maleic acid/ base | 100 | 1 | 2 |
| 19 | 80 mole % vinyl acetate/20 mole % vinyl ester of versatic acid | "BE336" melamine formaldehyde | None | 100 | 3 | 2 |

TABLE 3-continued

| Example | Polymer | Condensation Product | Catalyst | Adhesion Test | Scratch Test | Rub Test |
|---|---|---|---|---|---|---|
| 20 | copolymer " | " | maleic acid/base | 100 | 0 | 2 |
| 21 | 75 mole % vinyl acetate/25 mole % dioctyl maleate copolymer | " | None | 100 | 2 | 3 |
| 22 | " | " | maleic acid/base | 100 | 2 | 2 |

The products of Examples 14 to 22 and the control were also solvent resistant.

EXAMPLES 23 AND 24

Coated films were prepared by the procedure and using the general coating composition described in relation to Examples 14 to 22 and were tested by the same procedure. In these Examples 23 to 24, however, the coating was superimposed on the copolyester substrate layer of a biaxially oriented and heat-set copolyester/polyethylene terephthalate laminate film. The copolyester layer was formed from 20 mole % ethylene isophthalate and 80 mole % ethylene terephthalate units. The coating ingredients and the properties of the coated film are shown in Table 4. The coatings were about 5 microns thick.

TABLE 3

| Example | Polymer | Condensation Product | Catalyst | Adhesion Test | Scratch Test | Rub Test |
|---|---|---|---|---|---|---|
| 23 | 85 mole % vinyl acetate/15 mole % ethyl hexyl acrylate copolymer | "BE336" melamine formaldehyde | None | 100 | 4 | 20 |
| 24 | "Poval" 205 88% hydrolysed copolymer | " | " | 50 | 3 | >80 |

The films prepared in Examples 23 and 24 were solvent resistant.

EXAMPLE 25

An aqueous coating latex of the composition given below, parts being quoted by weight, was prepared:

| | |
|---|---|
| 88% by weight vinylidene chloride/12% by weight acrylonitrile copolymer | 14.0 parts |
| "BE336" melamine formaldehyde (intra-molecular cross-linking component) | 4.6 parts |
| Particulate silica, commercially available as "Celite" | 8.0 parts |
| Hydroxy ethyl cellulose | 0.5 parts |
| Water | 72.9 parts |

The coating latex was superimposed on the copolyester layer of a biaxially oriented and heat-set copolyester/polyethylene terephthalate film laminate by the procedure described in relation to Examples 1, 2 and 3. The copolyester was formed from 20 mole % ethylene isophthalate and 80 mole % ethylene terephthalate units. The coated film was tested by the procedure described in relation to Examples 1, 2 and 3.

The applied coating was approximately 5 microns thick and had excellent adhesion to the film since none of the coating was removed in the adhesion test. Scratch resistance was good with a test result of 3 and rub resistance was excellent with a test result of 35. Solvent resistance was also good since no coating deformation or wrinkling occurred in the solvent treated area.

The coating film was suitable for use as a drafting or drawing office material.

EXAMPLE 26

Example 25 was repeated using a coating latex of the same composition and using the same test procedure. The latex was superimposed on a substrate layer of a copolymer of 45% by weight ethyl acrylate, 50% by weight methyl methacrylate and 5% by weight methacrylamide cross-linked with a melamine formaldehyde condensate applied to the surface of a conventionally oriented and heat-set polyethylene terephthalate film.

The applied coating was approximately 5 microns thick and had excellent adhesion to the film since none of the coating was removed in the adhesion test. Scratch resistance was poor with a test result of 0 and rub resistance was excellent with a test result of 34. Solvent resistance was also good since no coating deformation or wrinkling occurred in the solvent treated area.

EXAMPLES 27 to 38

Aqueous copolymer latices were applied by conventional means to the substrate layer coatings of biaxially oriented and heat-set polyethylene terephthalate films. The substrate layers employed were:
a. a copolymer of, by weight, 45% ethyl acrylate, 50% methyl methacrylate and 5% methacrylamide cross-linked with melamine formaldehyde; and
b. a copolymer of, by weight, 48% ethyl acrylate, 40% methyl methacrylate, 10% glycidyl methacrylate and 2% hydroxy ethyl methacrylate;
c. "Primal" AC604 (a copolymer of methyl methacrylate/butyl acrylate) cross-linked with melamine formaldehyde;
d. "Primal" AC73 (a copolymer of ethyl acrylate/methyl methacrylate/secondary amide) cross-linked with melamine formaldehyde;
e. "Glascol" HN2 (a sodium salt of an acrylic copolymer cross-linked with melamine formaldehyde;
f. a copolyester of 20 mole % ethylene isophthalate and 80 mole % ethylene terephthalate.

The general latex composition is given below, percentages being quoted by weight:

| | |
|---|---|
| Acrylic copolymer | 20.0% based on weight of solids |
| "BE336" melamine formaldehyde | 5.0% |
| Particulate silica commercially available as "Celite" | 10.0% |
| Hydroxy ethyl cellulose | 0.5% |
| Water | to make 100% |

The acrylic copolymers used in Examples 27 to 38 in the above composition were:

g. a copolymer of, by weight, 45% ethyl acrylate, 50% methyl methacrylate and 5% methacrylamide; and h. a copolymer of, by weight, 48% ethyl acrylate, 40% methyl methacrylate, 10% glycidyl methacrylate and 2% hydroxy ethyl methacrylate.

The applied latices were dried and cured by heating for 1 minute at 150° C.

The finished coatings, which were approximately 5 microns thick were tested for pencil hardness. The test was effected to determine the hardest pencil lead which could be used to mark the coating without damaging the adhesion of the coatings to the film. The tests were effected by the same operator under the same pencil pressure and against a hard backing sheet.

The substrate layers, the acrylic copolymer of the coating latex and the results of the pencil hardness test are shown in Table 5. Comparative examples, designated "control" in Table 5, relate to the coating of untreated polyethylene terephthalate film surfaces, i.e. films devoid of substrate layers.

TABLE 5

| Example | Substrate | Acrylic copolymer | Pencil hardness |
|---|---|---|---|
| Control | None | g) | 3H |
| Control | None | h) | 2H |
| 27 | a) | g) | 6H |
| 28 | a) | h) | 4H |
| 29 | b) | g) | 6H |
| 30 | b) | h) | 4H |
| 31 | f) | g) | 8H |
| 32 | f) | h) | 8H |
| 33 | c) | g) | 8H |
| 34 | c) | h) | 6H |
| 35 | d) | g) | 8H |
| 36 | d) | h) | 4H |
| 37 | e) | g) | 5H |
| 38 | e) | h) | 5H |

The tests indicate that the presence of a substrate improves the pencil hardness, i.e. the resistance of the lacquers to damage by pencil lead, in relation to films which do not carry a substrate.

"Celite," "Primal," "Glascol," "Epikote," "Poval" and "Elvacet" are trade marks of Johns-Manville Corp, Rohm and Haas Co, Allied Colloid Ltd, Shell Ltd, Kurashiki Rayon Co Ltd, and E I du Pont de Nemours and Company respectively, "BE336," "BE670," "BE333" and "BT309" are trade marks of British Industrial Plastics Ltd and "W1772" and "W1760" are trade marks of British Petroleum Co Ltd.

We claim:

1. A process for the production of a coated film, which comprises coating a substrate layer applied to a self-supporting synthetic linear polyester film with an aqueous, cross-linking polymeric latex or solution, wherein said substrate layer comprises: (1) a copolymer formed from ethyl acrylate, methyl methacrylate and methacrylamide, or (2) a copolyester, and the aqueous polymeric latex or solution applied thereto comprises:

A.
   i. one or more polymers or copolymers of one or more of acrylic acid, methacrylic acid, an ester of acrylic acid or methacrylic acid;
   ii. an unhydrolysed or a partially hydrolysed polymer or copolymer of vinyl acetate; or
   iii. one or more copolymers of vinylidene chloride; and B.
   one or more resinous components capable of intra-molecular cross-linking; thereby providing a polyester film having a substrate superimposed thereon coated with said polymeric latex or solution.

2. A process according to claim 1, in which the linear polyester film comprises a film of polyethylene terephthalate.

3. A process according to claim 1, in which, when the aqueous coating latex or solution comprises a polymer or copolymer of an acrylic or methacrylic acid ester, the ester is methyl, ethyl, propyl, isopropyl, butyl, hexyl, heptyl, n-octyl, 2-ethylhexyl or glycidyl acrylate or methacrylate.

4. A process according to claim 3, in which the copolymer comprises a copolymer of methyl methacrylate, ethyl acrylate and ureido complexes; a copolymer of 55 weight % methyl methacrylate and 45 weight % ethyl acrylate; a copolymer of 48 weight % methyl methacrylate, 40 weight % ethyl acrylate, 10 weight % glycidyl methacrylate and 2 weight % hydroxy ethyl methacrylate; and a copolymer of 50 weight % methyl methacrylate, 45 weight % ethyl acrylate and 5 weight % methacrylamide.

5. A process according to claim 1, in which, when the aqueous coating latex or solution comprises an unhydrolysed or a partially hydrolysed copolymer of vinyl acetate, the copolymer is formed with a comonomer comprising a dialkyl maleate, 2-ethylhexyl acrylate, ethylene, vinyl chloride or a vinyl ester of versatic acid.

6. A coated film which comprises a self-supporting synthetic linear polyester film having a substrate layer superimposed thereon, said substrate layer comprising: (1) a copolymer formed from ethyl acrylate, methyl methacrylate and methacrylamide, or (2) a copolyester, and a cross-linked polymeric layer superimposed on the substrate layer comprising:

A.
   i. one or more polymers or copolymers of one or more of acrylic acid, methacrylic acid, an ester of acrylic acid or methacrylic acid;
   ii. an unhydrolysed or a partially hydrolysed polymer or copolymer of vinyl acetate; or
   iii. one or more copolymers of vinylidene chloride; and B.
   one or more resinous components capable of intra-molecular cross-linking.

7. A film according to claim 6, in which the linear polyester film comprises a film of polyethylene terephthalate.

8. A film according to claim 6, in which, when the layer superimposed on the substrate comprises a polymer or copolymer of an acrylic or methacrylic acid ester, the ester is methyl, ethyl, propyl, isopropyl, butyl, hexyl, heptyl, n-octyl, 2-ethylhexyl or glycidyl acrylate or methacrylate.

9. A film according to claim 8, in which the copolymer comprises a copolymer of methyl methacrylate, ethyl acrylate and ureido complexes; a copolymer of 55 weight % methyl methacrylate and 45 weight % ethyl acrylate; a copolymer of 48 weight % methyl methacrylate, 40 weight % ethyl acrylate, 10 weight % glycidyl methacrylate and 2 weight % hydroxy ethyl methacrylate; and a copolymer of 50 weight % methyl methacrylate, 45 weight % ethyl acrylate and 5 weight % methacrylamide.

10. A film according to claim 6, in which, when the layer superimposed on the substrate comprises an unhydrolysed or a partially hydrolysed copolymer of vinyl acetate, the copolymer is formed with a comonomer comprising a dialkyl, 2-ethylhexyl acrylate, ethylene, vinyl chloride or a vinyl ester of versatic acid.

* * * * *